Patented Nov. 1, 1932

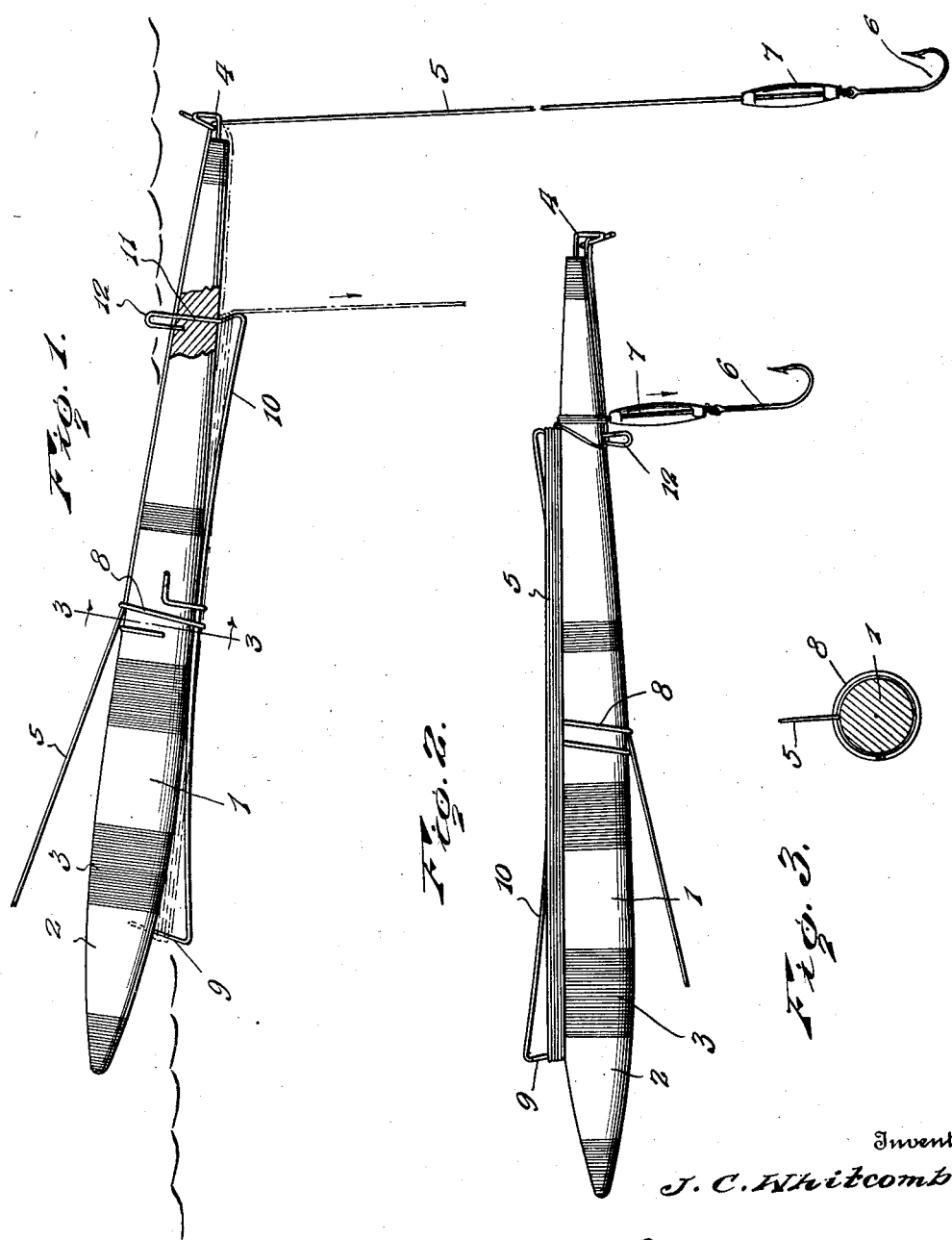

1,885,311

UNITED STATES PATENT OFFICE

JOSEPH C. WHITCOMB, OF PRINCETON, MINNESOTA

FLOAT FOR FISHLINES

Application filed September 17, 1931. Serial No. 563,436.

This invention relates to floats for fishing lines and has for its object the provision of means whereby the line may be wound upon the float in such a manner that it will automatically unwind therefrom when the line and float are thrown to the water prior to fishing. A further object of the invention is to provide means whereby the float may be set so that the line will be unwound to a predetermined length. The invention is illustrated in the accompanying drawing and will be hereinafter fully described and particularly defined.

In the drawing:

Figure 1 is an elevation, partly broken away and in section, of a float constructed in accordance with my invention and as it appears in use, Fig. 2 is a similar view showing the line wound upon the float prior to casting, Fig. 3 is a detail section on the line 3—3 of Fig. 1.

The body 1 of the float is preferably of circular cross section and tapered toward both ends and may be of any preferred buoyant material. It is preferably of wood and painted with encircling bands of contrasting colors, as indicated at 2 and 3, so that it may be easily seen when upon the surface of the water. One end of the float has secured therein an eye or guide 4 through which the line 5 passes to the hook 6 and sinker 7, and from said eye the line is carried along the body of the float to and through a ring 8 which is fitted slidably upon the body but in frictional engagement therewith so that it will remain at any desired point in the length of the body where it may be set. As shown in the drawing, this ring 8 may well be a spiral coil having several turns so that it will resiliently grasp the body and thereby firmly retain its position thereon, and it will be noted that the line is passed between the body and a coil of the ring so that it will be firmly held to the body and the length of the line, between the ring and the guiding eye 4, will be held close to the float. Near the end of the body, more remote from the eye 4, there is secured therein one end 9 of a reel 10 consisting of a strand of wire extending longitudinally of the body and having its end, remote from the anchoring end 9, extended through a passage provided therefor in the body, as shown at 11, the extremity of said end being doubled upon itself to form an eye or loop 12 against or through which the line 5 may be passed so as to be more effectually held in proper position upon the body.

When the device is not in use, the fish line is wrapped about the reel 10, as shown in Fig. 2, the hook-carrying portion of the line being bent about the loop 12 and given a few turns about the body so that the sinker 7 and the hook 6 will be held close to the body. When the device is to be used, the float is cast out upon the water and the weight of the sinker 7 will cause the same to fall at once to the underside of the float, as shown in Fig. 2, whereupon the float will be caused to rotate about its own longitudinal axis so that the reel will be on the underside of the same, as shown in Fig. 1. The weight of the sinker will then cause the several turns of the line to unwrap from the reel 10 and permit the line to fall vertically from the guide 4. The float will remain upon the surface of the water and by its position will indicate to the fisherman when a bite is had.

My device is exceedingly simple in construction and provides means whereby the fish line may be easily wrapped upon the float and automatically unwrapped therefrom when cast to the water, and by shifting the holding ring 8 along the body of the float, the extent to which the line will unwind may be regulated. It may be noted that the ring 8 passes around the intermediate portion of the reel and thereby holds the same close to the body of the float so that it will not interfere with the unwinding of the line as the sinker drops through the water.

Having thus described the invention, I claim:

1. A float for fish lines having a line guide at one end, a line-holding element mounted upon the float between the ends thereof, and a reel extending longitudinally of the float upon which the line may be wound.

2. A float for fishing lines comprising a buoyant body, and a reel consisting of a longitudinally extending strand having its ends fitted in the body and presenting projections at its ends about which the line may be wound.

3. A float for fishing lines comprising a buoyant body, a line guide at one end of the body, and a reel consisting of a strand extending longitudinally of the body between the ends thereof and having one end anchored in the body and its other end passing through the body and providing a guide at the opposite side of the body, the line being held to the body between the ends of the same and passing through the guide at the end of the body and then about the guide at the end of the reel and then across the body and wound upon the reel.

4. A float for fish lines consisting of a buoyant body, a line guide at one end of the body, a line-retaining ring slidably mounted upon the body between the ends thereof and frictionally holding the line to the body, a reel secured to and extending longitudinally of the body, a projection on the float at the side opposite the reel between the line guide and the retaining ring, the line being passed from the retaining ring through the eye at the end of the body and then back about the projection on the side of the body and then wrapped upon the reel.

In testimony whereof I affix my signature.

JOSEPH C. WHITCOMB. [L. S.]